United States Patent
Olsen et al.

(10) Patent No.: US 6,871,132 B2
(45) Date of Patent: *Mar. 22, 2005

(54) ENGINE LIMITER FOR POWERED VEHICLES

(75) Inventors: Stuart W. Olsen, Edmonton (CA); Jason A. Jurok, Crossfield (CA); Darin R. Silvernagle, Balzac (CA)

(73) Assignee: Vertias DGC Inc., Houston, TX (US)

( * ) Notice: Subject to any disclaimer, the term of this patent is extended or adjusted under 35 U.S.C. 154(b) by 34 days.

This patent is subject to a terminal disclaimer.

(21) Appl. No.: 10/407,891

(22) Filed: Apr. 4, 2003

(65) Prior Publication Data

US 2004/0199322 A1 Oct. 7, 2004

(51) Int. Cl.[7] .............................. B60T 8/32; G06F 7/00
(52) U.S. Cl. ........................ 701/93; 701/104; 701/110; 123/335
(58) Field of Search .................... 701/93, 101, 102, 701/104, 110, 112; 180/178, 179; 123/335, 339.14, 406.24, 406.64

(56) References Cited

U.S. PATENT DOCUMENTS

| | | | |
|---|---|---|---|
| 4,134,373 A | * | 1/1979 | Kibler et al. ................ 123/352 |
| 5,652,486 A | * | 7/1997 | Mueller et al. ............. 318/369 |
| 5,775,290 A | * | 7/1998 | Staerzl et al. ............... 123/335 |
| 5,802,043 A | * | 9/1998 | Skillen et al. .............. 370/258 |
| 6,173,692 B1 | * | 1/2001 | Hellmich et al. ........... 123/305 |
| 6,253,143 B1 | * | 6/2001 | Silvernagle et al. .......... 701/93 |
| 2002/0170762 A1 | * | 11/2002 | Daneshmand ............... 180/178 |

* cited by examiner

Primary Examiner—Tan Q. Nguyen
(74) Attorney, Agent, or Firm—Conley Rose, P.C.

(57) ABSTRACT

A vehicle control unit is disclosed which can be coupled between a tachometer sensor and an electronic ignition system on a vehicle. The unit is also coupled to a speedometer sensor to measure the vehicle's speed. The vehicle control unit limits the vehicle speed by monitoring the tachometer signal from the tachometer sensor and passing the tachometer signal to the ignition system if the engine speed is within predetermined limits. The tachometer signal is a pulse train which is used by the electronic ignition system to determine ignition timing. The vehicle control unit limits both vehicle speed and engine speed by disconnecting pulses from the tachometer sensor and generating time-delayed pulses of its own to delay the combustion of fuel until after the instance of maximum fuel compression, thereby reducing engine power when the vehicle or engine speeds exceed predetermined limits.

33 Claims, 6 Drawing Sheets

ENGINE LIMITER FOR POWERED VEHICLES

BACKGROUND

Field of the Invention

The present invention generally relates to a system and method for enhancing driver safety. More particularly, this invention relates to an engine limiter system and related method, including a vehicle control unit, which regulates the engine speed and vehicle speed of a powered vehicle, particularly an off-road vehicle. Still more particularly, the invention relates to a programmable electronic engine limiter module which may be easily added to vehicles having electronic ignition systems to prevent dangerous or reckless operation of the vehicle.

Entities that conduct business in wilderness areas often find off-road vehicles to be invaluable tools. Single-person all-terrain vehicles (ATVs), such as three-wheelers (trikes) and four-wheelers (quads), are extensively used by survey parties, for example, operating in otherwise inaccessible areas. However other vehicles, such as snowmobiles, waterbikes, motorcycles, and golf carts, also have characteristics that lend themselves to specialized uses by these entities. Although indispensable, use of these vehicles poses certain problems for these entities. These vehicles may be dangerous to operators who operate them at excessive speeds. Accidents that occur are nearly always the result of driving too fast. The terrain tends to be unpredictable, so that lower speeds are needed for safe operation. Nevertheless, repeated warnings to vehicle operators may have little effect in ensuring safe operation. Reducing the accident rate will lead to reductions in injuries, equipment damage, insurance, and repair costs.

Certain existing engine limiters operate on the principle of suppressing ignition pulses, leaving unignited fuel in the engine cylinders, which can contribute to fouled plugs and other problems. In addition, unignited fuel does not produce the power needed by the engine to most adequately power the vehicle, resulting in poor performance, including rough running, lack of power, and inadequate towing capability, so this method for speed limiting is not optimal. Accordingly, it is desirable to provide an easily installed system for limiting engine speed while still maintaining smooth operation of powered vehicles.

SUMMARY

The present invention contemplates an engine limiter system and related method. In one embodiment, the system includes a vehicle control unit, which can be coupled between a tachometer sensor for sensing engine speed and an electronic ignition system on a powered vehicle. The vehicle control unit (or simply, "unit") is preferably also coupled to a speedometer sensor to receive a signal indicative of the vehicle speed. The vehicle control monitors engine speed information in the form of a tachometer signal generated by a tachometer sensor, and passes the tachometer signal to the ignition system if the engine speed is below a predetermined limit. The unit limits speed when the engine speed is above predetermined limits by disconnecting signals from the tachometer sensor and sending delayed signals generated by the unit itself to the ignition control module.

The unit preferably tests for tampering approximately every ten seconds when the vehicle is not in motion. If tampering is detected, the unit disables the engine. The vehicle control unit of the preferred embodiments has the ability to detect the type vehicle it is installed into by monitoring the tachometer and speedometer pulses, which relate to the various gear ratios corresponding with specific vehicle types. A wireless keychain is also disclosed herein for communicating with the vehicle control unit. The various characteristics described above, as well other features, will be readily apparent to those skilled in the art upon reading the following disclosure.

BRIEF DESCRIPTION OF THE DRAWINGS

A complete understanding of the preferred embodiments can be obtained when the following detailed description of the preferred embodiments is considered in conjunction with the following drawings, in which.

NOTATION AND NOMENCLATURE

Certain terms are used throughout the following description and claims to refer to particular system components. As one skilled in the art will appreciate, components may be referred to by different names. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF PREFERRED EMBODIMENTS

The present invention discloses an engine limiter system and related method. In one embodiment, the system includes a vehicle control unit, which can be coupled between a tachometer sensor for sensing engine speed and an electronic ignition system on a powered vehicle. The vehicle control unit (or simply, "unit") is preferably also coupled to a speedometer sensor to receive a signal indicative of the vehicle speed. The vehicle control monitors engine speed information in the form of a tachometer signal generated by a tachometer sensor, and passes the tachometer signal to the ignition system if the engine speed is below a predetermined limit.

The unit limits speed when the engine speed is above predetermined limits by disconnecting signals from the tachometer sensor and sending delayed signals generated by the unit itself to the ignition control module. Preferably, the vehicle control unit substitutes a selected number of delayed replacement pulses for the tachometer pulse sequence, the selected number depends on a margin by which the vehicle speed exceeds the predetermined value, and increases as the margin increases. The vehicle control unit of the preferred embodiments has the ability to detect the type vehicle it is installed into, by methods to be discussed later herein.

Figure 1:
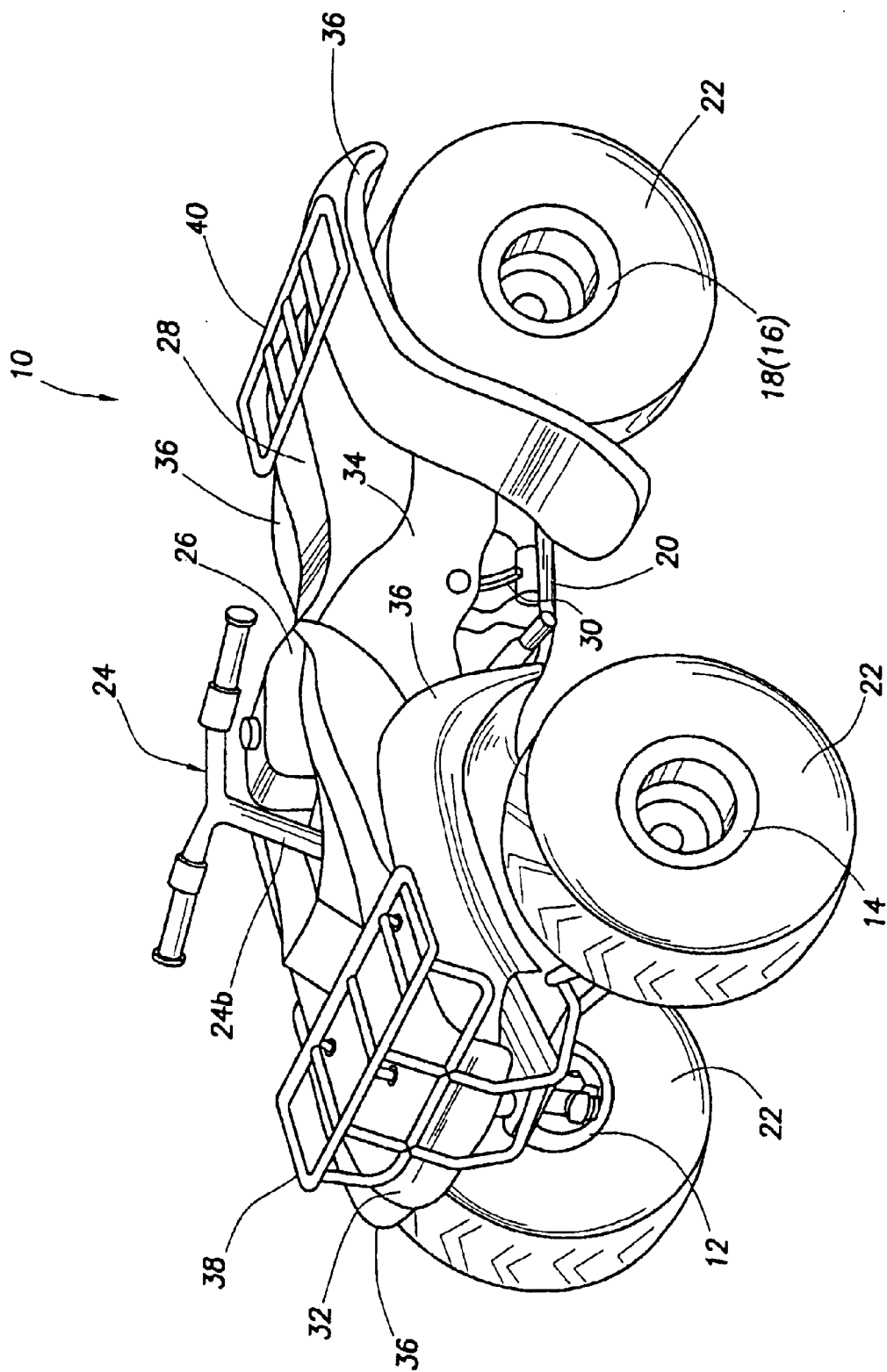
FIG. 1 shows an all-terrain vehicle, which is one contemplated environment for the preferred embodiments.

Referring now to FIG. 1, a saddle-seat all-terrain vehicle 10 is shown. This vehicle 10 includes a pair of right and left front wheels 12, 14, and a pair of right and left rear wheels 16, 18, which are respectively suspended from front and rear portions of a vehicle framework 20. A balloon-type low-pressure tire 22 is mounted around each of the front wheels 12, 14 and the rear wheels 16, 18. A steering handle 24, a fuel tank 26, and a saddle seat 28 are disposed on the upper portion of the vehicle frame 20. An engine 30 for driving the rear wheels 16, 18 is disposed within the vehicle frame 20. In some configurations, the engine 30 also drives front wheels 12, 14.

A front body cover 32 and a rear body cover 34 are arranged over the upper portions of vehicle frame 20. The front body cover 32 and rear body cover 34 each include fenders 36 for covering upper portions of front and rear tires 22. Front and rear cargo carriers 38, 40 are arranged over the front and rear body covers 32, 34 for allowing cargo to be secured thereto. It should be appreciated that the foregoing features of the vehicle, such as the positioning and type of body cover, the use of cargo carriers, etc. may readily be varied. This description of the vehicle is given to provide an illustrative environment in which the safety limiter may be used, and is not intended to limit the preferred embodiments of the present invention. Moreover, it is recognized that the principles described herein not only apply to all-terrain vehicles, but also apply to other powered vehicles such as motorcycles, snowmobiles, three-wheeled vehicles, and the like.

Figure 2:
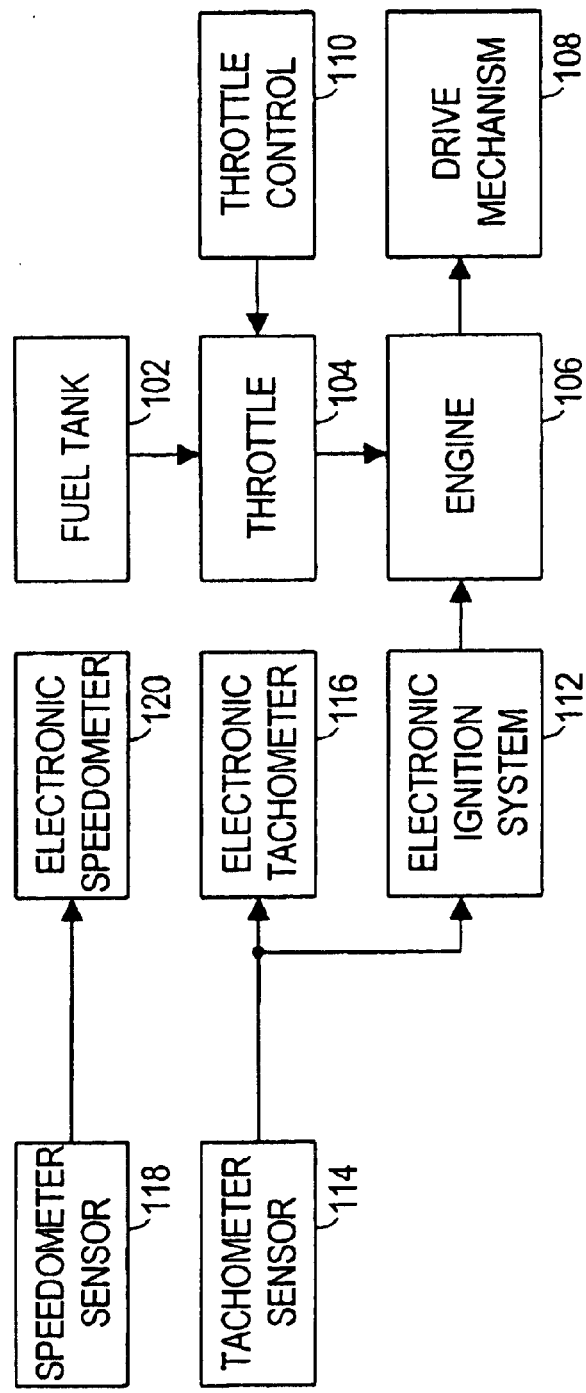
FIG. 2 shows a block diagram of a typical engine configuration known in the art.

Referring now to FIG. 2, a representative existing engine configuration is shown. A fuel tank 102 is coupled to provide fuel to an engine 106 via a throttle 104. The engine 106 converts the fuel into power to drive the vehicle drive mechanism 108. The amount of power provided to the drive mechanism 108 may be governed by a vehicle operator using throttle control 110. The engine configuration of FIG. 2 includes an electronic ignition system 112 which provides an ignition signal to engine 106. The conversion of fuel into drive power by engine 106 depends upon timed ignition pulses from the electronic ignition system 112. To provide these ignition pulses, the electronic ignition system 112 relies on a signal from a tachometer sensor 114, which provides a signal indicative of the engine speed.

In preferred embodiments, the tachometer sensor 114 is a Hall effect sensor located near the crankshaft or the camshaft in engine 106, and the tachometer signal is an electronic "pulse train" (a repetitive series of voltage pulses) which is indicative of the position of the corresponding engine element. In alternative embodiments, the tachometer sensor 114 may be a magneto, or an inductive coil sensor. The tachometer signal 114 may also be provided to an electronic tachometer 116 for display of an engine speed to the vehicle operator. Preferably a speedometer sensor 118 is included to provide an electronic pulse train to an electronic speedometer 120 for display of a vehicle speed to the vehicle operator. In the preferred embodiments, the speedometer sensor is a Hall effect sensor located near a driveshaft, an axle, or wheel in drive mechanism 108, and the speedometer signal is indicative of the vehicle speed.

This representative engine configuration is provided for explanatory purposes, and is not intended to limit the instant invention. One of skill in the art would readily recognize the applicability of the instant invention to various other engine configurations, including electric engines and engines where means other than control of a throttle are used by the operator to govern the amount of power provided by engine 106.

Several issues exist with existing methods for limiting engine and vehicle speeds. Existing methods which limit engine power by suppressing ignition pulses do not ignite the fuel in engine cylinders, leading to fouled spark plugs, rough engine running, and inadequate vehicle power. The lack of ignition in this existing method can make it difficult to tow or pull loads with the speed-limited engine. In cases where the vehicle is operated in rough, steep or wet terrain, it is important to maintain adequate, consistent power during operation. In contrast, the engine limiting method of the present invention yields smooth, consistent power that is within predetermined parameters.

Figure 3:
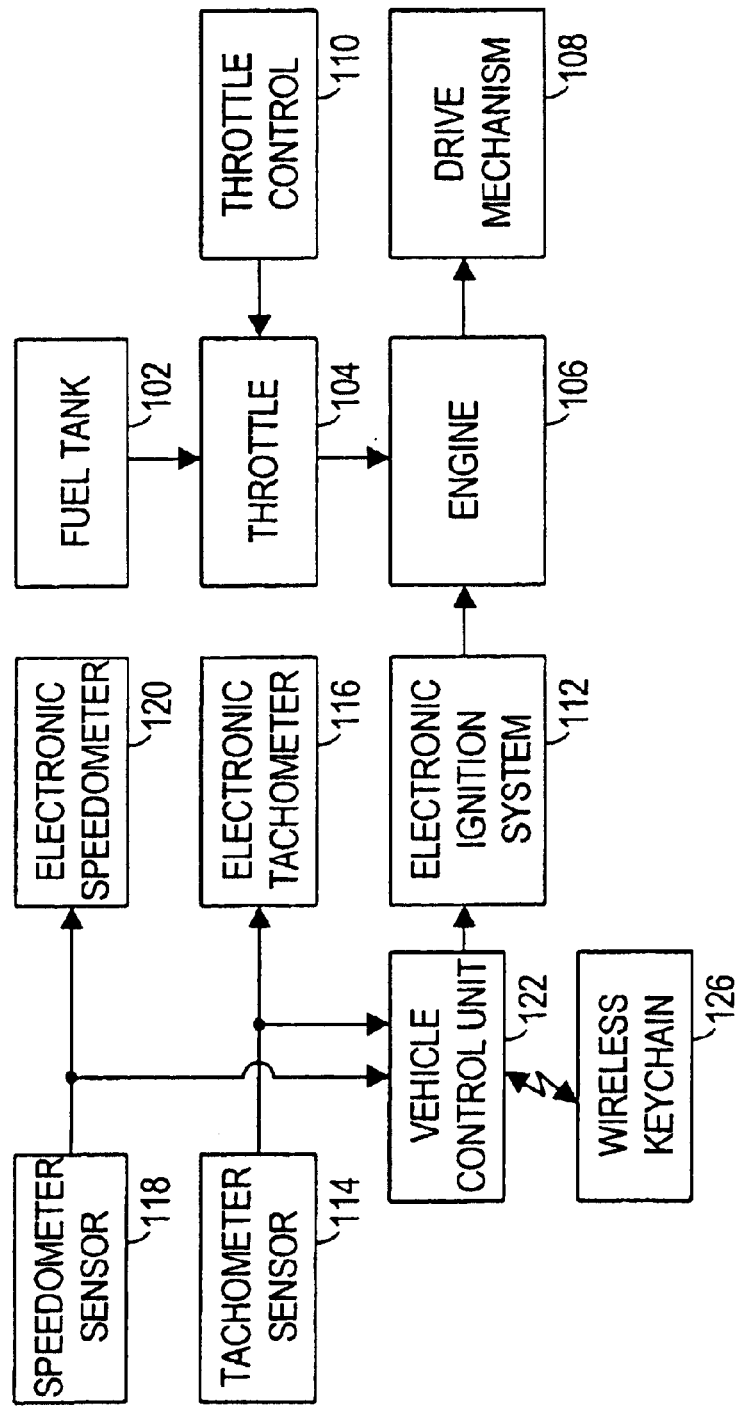
FIG. 3 shows a block diagram an engine configuration of the preferred embodiments including a vehicle control unit.

Referring now to FIG. 3, the representative engine configuration of FIG. 2 is shown having an added vehicle control unit 122 and a wireless keychain 126, to be discussed later in greater detail. The wireless keychain 126 may be used for communicating with the vehicle control unit. The vehicle control unit 122 receives the speedometer and tachometer signals from the speedometer sensor 118 and the tachometer sensor 114, respectively. The vehicle control unit 122 then passes the tachometer signal to the electronic ignition system 112 if it determines the engine speed is within predetermined limits. The tachometer signal is a pulse train, which, in conventional vehicles, is used by the electronic ignition system to determine ignition timing.

If vehicle control unit 122 senses by the tachometer signal that the engine speed is exceeding predetermined limits, an output signal logic (to be discussed later in detail) within vehicle control unit 122 will output a new signal comprised of "replacement pulses." This replacement output signal is generally time-delayed from the tachometer signal input to vehicle control unit 122 and delivered to electronic ignition system 112. It will be understood that the delay is variable, and dependent on the margin that the engine speed exceeds the predetermined limit value. Meanwhile, the pulses from the tachometer sensor 114 are disconnected by a method to be discussed later in detail, so that the original, unaltered tachometer signal is not sent to the electronic ignition system 112.

The unit-generated replacement signal ignites the fuel in a cylinder of the engine 106, but at an instant when the pistons are withdrawing, so that limited power is drawn from the spark since the fuel is not at maximum compression. Limiting engine speed prevents excessive vehicle speed by limiting the power output of the engine, thus leading to slower and safer operational speeds. In addition, limiting engine speed prevents damage to the engine and related components from over-revving, a condition in which the engine is operated near or beyond its desired maximum parameters. The operational parameters preferably include limits on engine speed, vehicle speed, and optionally, ignition pulse shape and timing. In one exemplary embodiment, the engine speed limit can be set in increments of 500 revolutions per minute (RPM), the vehicle speed limit can be set in increments of 5 miles per hour (MPH), and the pulse timing can be modified accordingly.

In a preferred embodiment, the vehicle control unit 122 is a compact electronic module. The vehicle control unit 122 is preferably configured to be easily mounted in an accessible spot on vehicle frame 20, and is provided with a simple connector, which is preferably a commercially available weatherproof industrial connector, for easy coupling and decoupling with the vehicle's factory-installed electrical system. Such an industrial connector may also be operable as a serial port, possibly using an adapter, for readily communicating with a computer. The unit 122 itself is preferably located in an enclosed or shielded position on the vehicle, such as under a fender to protect the unit from physical damage. Modifications to the original electrical system to accommodate the vehicle control unit 122 are advantageously minor and easily reversible.

Figure 4:
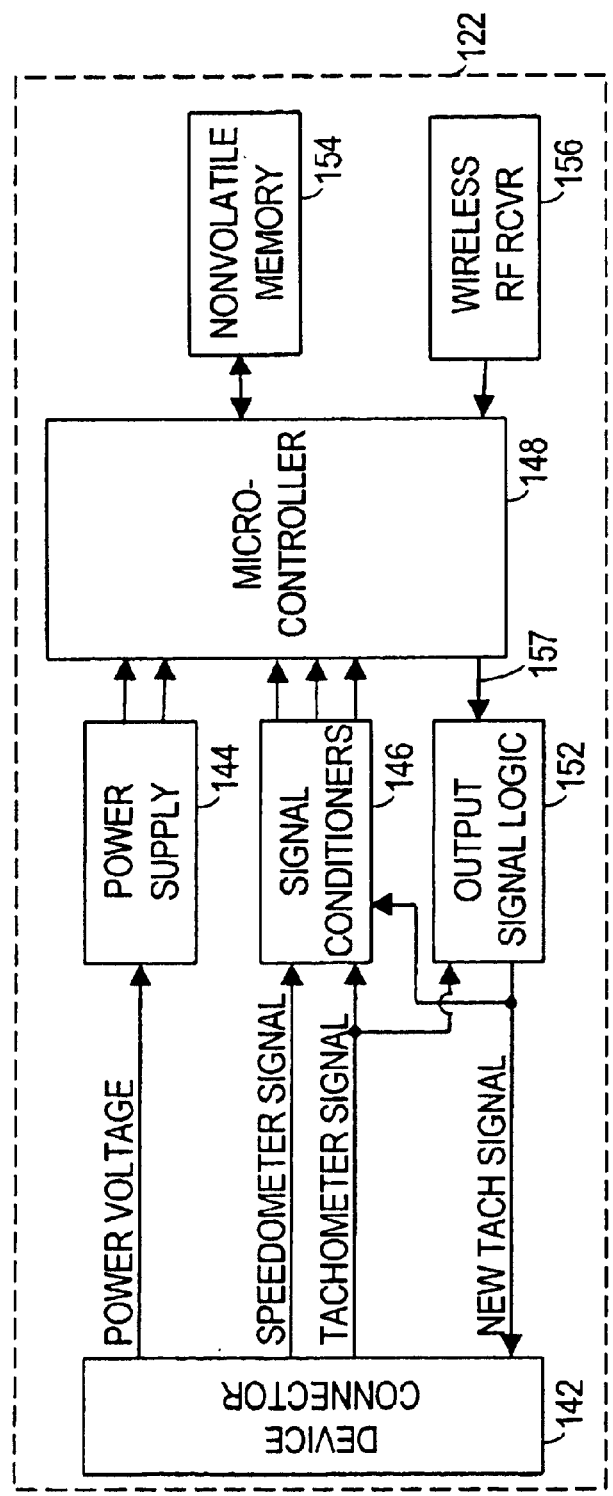
FIG. 4 shows a block diagram of one embodiment of the vehicle control unit of FIG. 3 including a microcontroller.

Referring now to FIG. 4, a block diagram is shown of one embodiment of vehicle control unit 122. An electrical device connector 142 supplies power voltages (such as ground and 12 volts) to power supply 144. Power supply 144 provides power conversion and voltage regulation as needed, and supplies power to the rest of the components in control unit 122. Power supply 144 is preferably capable of being placed in a power-down or "sleep" mode by microcontroller 148. In sleep mode, power to various components is removed to reduce power consumption, thereby reducing the drain on the vehicle's battery.

Device connector 142 also provides the speedometer and tachometer signals to signal conditioners 146. Signal conditioners 146 provide protection against signal transients, and "clean up" the incoming signals to better approximate digital pulse waveforms. Accordingly, signal conditioners 146 preferably include lowpass filters and saturating amplifiers.

Microcontroller 148, which may be selected from the PIC® microcontroller family manufactured by Microchip Technology, Inc., processes the signals from signal conditioners 146. Microcontroller 148 processes the speedometer and tachometer signals, and responsively determines whether or not to pass each tachometer pulse to the engine as an unaltered ignition pulse or to generate a new, time-delayed replacement pulse based on predetermined and programmed criteria.

Output signal logic 152 normally passes the tachometer signal back to connector 142, so that pulses from the tachometer sensor are passed on to the electronic ignition system 112, as shown in FIG. 3. However, when microcontroller 148 determines the engine is exceeding predetermined parameters, the output signal logic 152 blocks pulses from the tachometer sensor 114 from being passed on to ignition system 112 and generates a new tachometer signal in the form of replacement output pulses. The output signal logic 152 may automatically replace blocked pulses with delayed pulses, or may alternatively generate replacement pulses in response to a trigger signal from the microcontroller 148. Microcontroller 148 is coupled to a nonvolatile memory 154 to store programmable parameters. The nonvolatile memory may be contained within the microcontroller. Memory 154 may additionally store program code for execution by microcontroller 148. The microcontroller 148 is also coupled to wireless RF port logic 156 for detecting transmissions from a wireless keychain 126.

Figure 5:
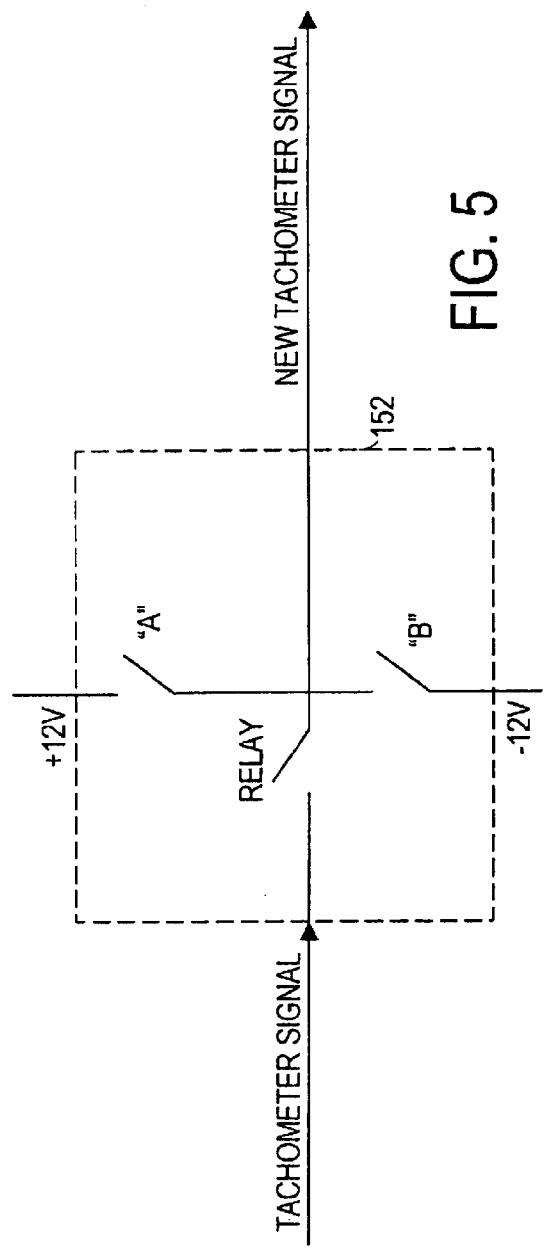
FIG. 5 shows a block diagram of the output signal logic of FIG. 4.

In a preferred embodiment, the microcontroller 148 blocks the original tachometer signal signal after one of the pre-programmed limits has been exceeded. Referring now to FIG. 5, a output signal logic 152 may include a relay, or some other form of switch which can be closed by command from the microcontroller if the tachometer signal is to pass unaltered back to device connector 142. The output signal logic 152 also includes switches "A" and "B," which can be closed to simulate a new tachometer signal with delayed replacement pulses. Using this method, switches A and B would be used specifically when the original tachometer signal is not being passed through. Preferably, switch A allows the new tachometer signal to be connected to a +12-volt supply from the vehicle itself, and switch B allows the new tachometer signal to be connected to a −12-volt supply from the vehicle control unit, although it will be understood that other implementations may also prove suitable. Both switch A and B are under the control of the microcontroller 148. By alternately closing switches A and B, the microcontroller can generate a waveform with the appropriate timing to simulate the tachometer signal to the ignition control module.

The vehicle control unit of the preferred embodiments is also capable of detecting tampering by various methods, including the methods of disconnection of the speedometer input, and also, of shorting the tachometer sensor and ignition control module lines together. The unit preferably tests for tampering approximately every ten seconds, preferably when the vehicle is not in motion, for the purposes of safety. If tampering is detected, the unit disables the engine. This prevents the engine limiting measures of the vehicle control unit from being wrongfully defeated.

A first method of tamper detection involves determining if the speedometer signal has been disconnected. The vehicle control unit senses if the wire from speedometer sensor to the device connector is "floating," i.e. whether it has been disconnected. For this method, a signal conditioning circuit, in the form of a "window comparator," is used on the speedometer input. The speedometer is tied to a biasing circuit, preferably in the form of a resistor connected from the speedometer input to the upper supply voltage (commonly $V_{CC}$, or 5 volts), and a resistor connected from the speedometer input to the lower supply voltage (commonly ground, or 0 volts). This configuration ensures that, if there is nothing connected to the speedometer pin on the connector to the vehicle control unit, the voltage will float to the value determined by the two aforementioned resistors.

The window comparator determines if the voltage on the speedometer input is within a small window (e.g. between 2.1 and 2.4 volts) the conditioner notifies the microcontroller with a logic high (e.g. 5 volt) signal. If the voltage is outside this window, (e.g. below 2.1 volts or above 2.4 volts), the conditioner notifies the microcontroller with a logic low (e.g. 0 volt) signal. The resistor values of the biasing circuit are selected to ensure that this voltage is inside the voltage window, which allows the microcontroller to determine if no connection is being made to the speedometer input. In the vehicles examined to date, the output of the speedometer sensor never floats; it is either driven to its positive voltage supply level or driven to its negative voltage supply level.

Basically, if the speedometer sensor is connected to the speedometer input of the vehicle control unit, the speedometer voltage will be either high or low; it will never be in the comparator's window for any significant length of time. However, if the wire from the speedometer to the device connector is cut, and the voltage is allowed to float to the voltage determined by the resistors, the voltage will float into the window, where it remains, allowing the vehicle control unit to determine it has been disconnected.

Referring again to FIG. 5, a second tamper detection method involves monitoring the replacement tachometer signal when the unit is idling and not moving (for safety reasons). The relay is closed, so the tachometer signal is just passed directly through as the "new" tachometer signal, essentially unaltered. About one in every 100 pulses, the relay is opened, and a pulse is omitted. However, if outside the device connector, the tachometer signal has been shorted to the new tachometer signal line (a common method of tampering), the a newly generated tachometer pulse is present when it should not be. Since the tachometer signal passes through the signal conditioner, the microcontroller is aware of the original tachometer signal coming in and also of the new tachometer replacement signal coming out of the output signal logic. If the relay is open, the replacement, or new tachometer signal, should not be present. If this is detected, the engine may be disabled. In one embodiment, the output signal logic has the ability to ground the ignition such that the engine will stall.

Figure 6:
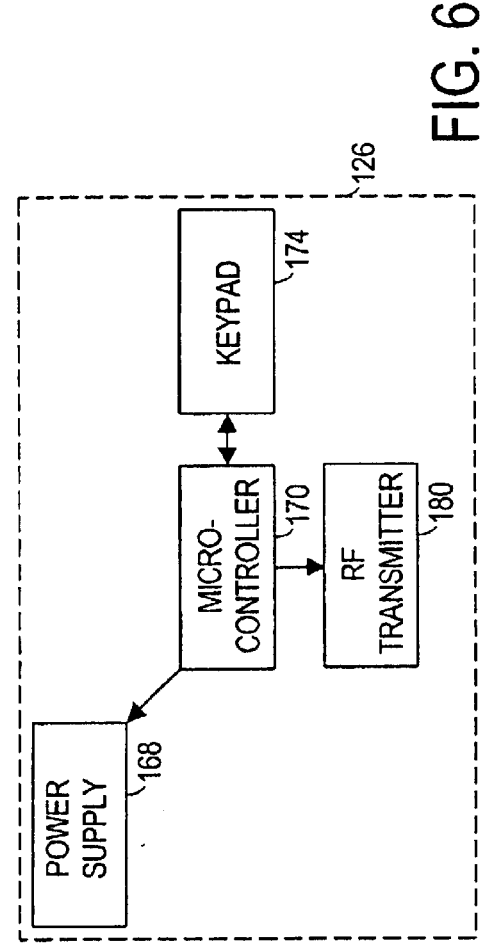
FIG. 6 shows a block diagram of one embodiment of a wireless keychain which may be employed with the vehicle control unit of FIG. 3.

Referring now to FIG. 6, a block diagram is shown of one embodiment of wireless keychain 126. Wireless keychain 126 includes a power supply 168, a microcontroller 170, a set of buttons, or keypad 174, and an RF transmitter 180 used in setting the actual speed limit value. Power supply 168 preferably includes a battery to provide power to the other components of wireless keychain 126. Wireless keychain 126 is preferably a convenient handheld unit for communicating with the vehicle control unit. The RF transmitter 180 within keychain 126 communicates with wireless RF receiver 156 of vehicle control unit 122. In response to input on keypad 174 from the operator of wireless keychain 126, the microcontroller 170 transmits a command and/or parameter settings to the vehicle control unit 122 via RF transmitter 180.

The vehicle control unit of the preferred embodiments also includes the ability to detect the type of vehicle it is installed into, making it nearly universal in application to a variety of vehicle types. The vehicle control unit performs vehicle type detection by monitoring the tachometer and speedometer pulses, and comparing them to determine various gear ratios relating to specific vehicle types. After the vehicle is driven once and then stopped, the unit compares the gear ratio data it has gathered to a database of information relating to several vehicle types. If the unit finds a match in the database for the information gathered, the next time the vehicle is driven, the unit will implement the appropriate operational parameters, limiting the engine and vehicle speed appropriately for that particular vehicle type.

In greater detail, the vehicle control unit detects the vehicle type it is installed into by monitoring both the speedometer signal and the tachometer signal. For a given number of tachometer pulses, the number of speedometer pulses is counted, forming a representative gear ratio. It will be understood that this ratio of speedometer pulses to tachometer pulses is not necessarily the true gear ratio, but may simply be a representative number correlating to a certain vehicle type. In operation, respective counters are zeroed for both the speedometer and tachometer pulse trains, and the pulses are then counted.

As an example, when the count for tachometer pulses reaches fifty, the number of speedometer pulses is retrieved and this number is then processed. Checks are made to watch for a gear change and subsequent stabilization of the number, as instability is generally due to slippage in the clutch after shifting. This stable number is then stored for later use as the basis for the search of the vehicle type table. Both counters are then zeroed, and the counting begins again. The number of speedometer pulses is used as the representative gear ratio number. It will be understood that, while fifty tachometer pulses are typically used to limit the speedometer count value to less than one byte, however other values could also be used. After each fifty tachometer pulses, a new representative gear ratio number is generated, The values comprising this representative ratio are generally accurate to within one count value.

While the vehicle is being driven, and generally the first time it is driven without engine limiting parameters enacted, a list typically including five representative gear ratios, or one for each gear the vehicle is driven in, is formed. Matching values are generally not counted, as they may represent duplicate gear readings. When the vehicle is stopped, this list of collected representative gear ratios is compared to the table of vehicle data having similar values. A match is made to a particular vehicle type in the table when a certain number of representative gear ratio values, typically three matching values out of five will result in a unique match. When the vehicle is driven again, the parameters related to the vehicle type selected are enacted, and the engine is appropriately limited. This feature of the preferred embodiments allows the vehicle control unit to be used in a multitude of vehicle types without needing a special configuration for a specific type vehicle.

The table of vehicle type data for setting proper speed-limiting parameters on a vehicle may be manually created by running tests on specific, known vehicle types, then calculating associated values for insertion into the table. Alternatively, the generation of tabular data may be automated. A preferred method of such automated data generation involves attaching a rotational sender to a wheel of the vehicle. Information from the rotational sender may be picked up by a rotational sensor, which preferably transmits on the same frequency as the wireless keychain, transmitting a signal to the vehicle control unit, indicating actual ground speed. This data generation method would allow the vehicle control unit to generate table entries for an unknown vehicle type and insert them into a table.

Figure 7:
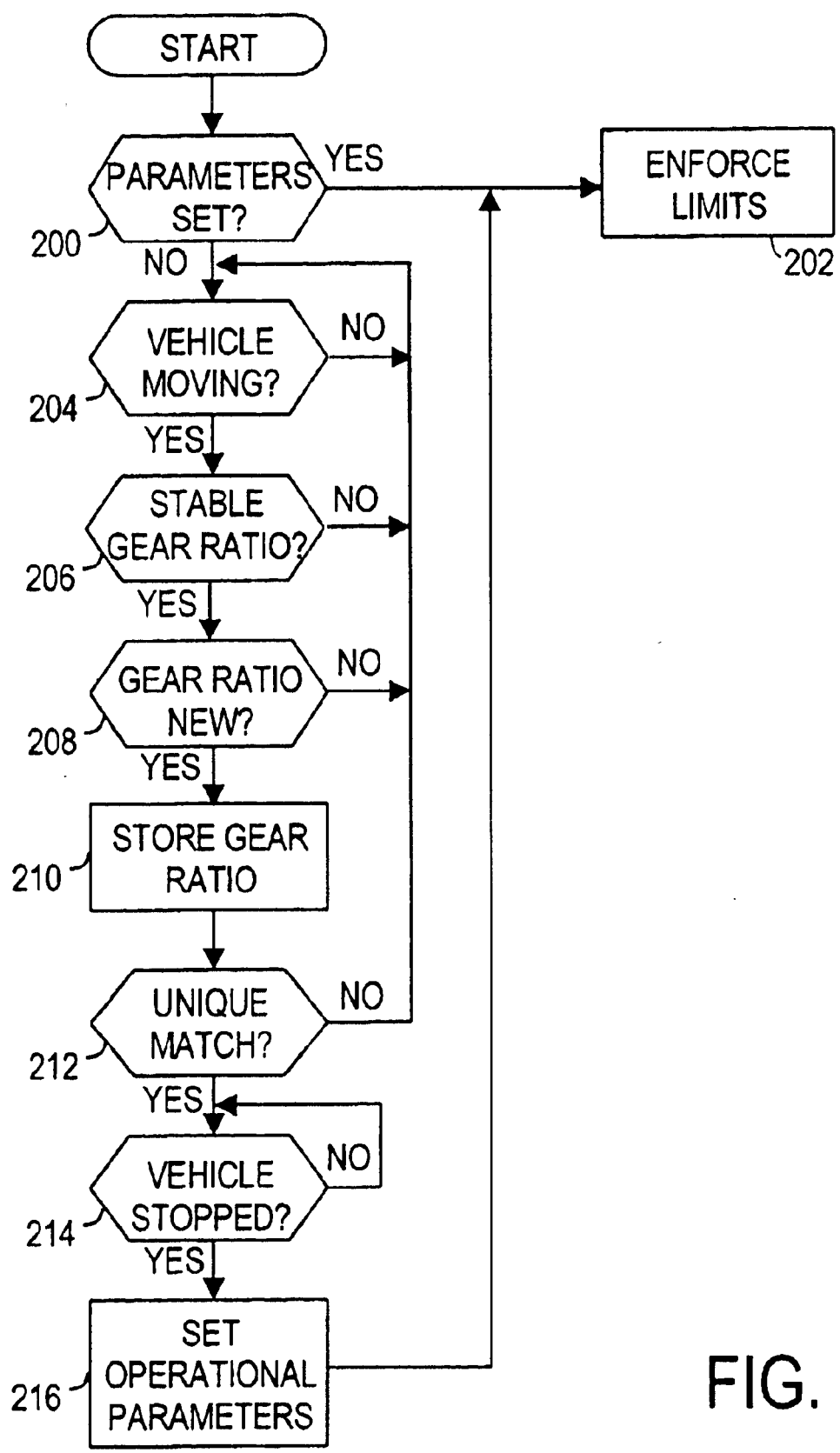
FIG. 7 shows a flow diagram of gear ratio detection in accordance with the preferred embodiments.

Referring now to FIG. 7, an exemplary flowchart of the operation of the gear detection means is shown. In block 200, the unit determines if engine limiting parameters have been set. If so, the unit enforces the limits, as in block 202. If not, in block 204, the vehicle control unit determines if the vehicle is in motion. If the vehicle is moving, the vehicle control unit decides if the gear ratio is stable (block 206), indicating no clutch slippage and that a trusted representative gear ratio value has been reached. If the gear ratio is stable, block 208 determines if the gear ratio value is new, or not yet recorded during this trip. If the gear ratio value is new, it is stored and compared to a value in the vehicle type data table, one vehicle entry at a time (block 210), repeating the process for each vehicle type in the table, until a match is found. In block 212, it is determined if a match is made between the representative gear ratio recorded and a the values of a specific vehicle type in the table or not. If a match is found, block 214 determines if the vehicle is stopped. For safety reasons, operational values are preferably not changed while the vehicle is in motion. If the vehicle is stopped, operational parameters are set, as in block 216, then enforced the next time the vehicle is in motion.

The software managing operations of the vehicle control unit is preferably structured as cooperative multitasking. Gear ratio detection may be just one task operating within the software. There are generally four tasks specific to the engine-limiting functionality of the unit: tachometer measurement, speed measurement, error determination, and tachometer generation. Tachometer measurement is responsible for monitoring the tachometer signal and maintaining present frequency data, monitoring for vehicle stopped indication, and monitoring the counters associated with the gear ratio measurements. Speed measurement provides substantially the same functional measurements for the speedometer signal.

Error determination compares the limits for both the speed and tachometer signals and converts them to an error and then to an actual required delay angle. The tachometer generation task samples the present value sampled from the tachometer pulses and stores this value in a buffer, preferably representing the last 1.6 milliseconds (ms) of values. The task then looks at the required dwell angle. If the dwell angle is zero, the task leaves the relay in the output signal logic closed in order to pass the unaltered signal. If the angle is not zero, the task opens the relay and accesses the buffer of values with the appropriate delay, then generates the new tachometer signal. This provides a record and playback function and provides delay to any different tachometer waveform. It will be understood that this task is generally disabled when making gear ratio measurements.

Two additional tasks within the preferred embodiment not specific to engine limiting are the radio task and the defeat task. The radio task watches the signal being received by the microcontroller from the wireless RF port logic and looks for a signal indicating the desired speed limit or other parameter. The radio task only executes while the vehicle is stopped and the engine is idling. The defeat task is responsible for the detection of different methods of defeating the unit as described previously in detail, and, in response, killing the engine.

A system and related method for limiting engine speed of off-road and other powered vehicles has been disclosed. This system and related method for limiting engine speed is more versatile than a simple governor which only limits engine speed. A large number of the ATV accidents in the field are directly attributable to excessive vehicle speed, which causes the operator to lose control or to be unable to avoid obstacles. Advantageously, the preferred embodiments limits the vehicle speed of the vehicle to a safe value without diminishing the vehicle's power when in the lower gears. Thus, the invention has the potential to sharply reduce the number of accidents, and result in a consequent reduction in insurance, maintenance, and repair costs.

The disclosed engine limiter system and related method protects in three ways: the engine speed is limited to prevent overrunning of the engine, the vehicle speed is limited to a safe value, and the vehicle control unit disables the vehicle if it detects tampering or wrongful disablement of the safety measures. In addition, the vehicle control unit of the preferred embodiments provides for smooth and consistent power to the vehicle, although limited, without causing damage to the engine or related components. The tamper detection capabilities of the preferred embodiments afford an extra measure of safety, preventing operation of the vehicle if the engine limiting measures have been disabled. The vehicle control unit of the preferred embodiments can be used with a variety of vehicle types, and is able to detect the type vehicle it is installed into, without special configuration, by comparing data gathered during operation to a database of vehicle types and parameters. This database can be updated, preferably by connecting to a communications port on the unit, which otherwise is used to connect the unit to the vehicle.

The above discussion is meant to be illustrative of the principles of the preferred embodiments. However, numerous variations and modifications will become apparent to those skilled in the art once the above disclosure is fully appreciated. It is intended that the following claims be interpreted to embrace all such variations and modifications.

What is claimed is:

1. A vehicle which comprises:
   an engine configured to convert fuel into power for a drive mechanism, wherein the engine includes an electronic ignition system;
   a tachometer sensor coupled to the engine and configured to generate a tachometer signal which indicates an engine speed and comprises a pulse sequence;
   a speedometer sensor coupled to the drive mechanism and configured to generate a speedometer signal which indicates a vehicle speed; and
   a vehicle control unit configured to receive the tachometer signal and the speedometer signal, and coupled to the electronic ignition system to output a replacement tachometer signal which comprises a replacement pulse sequence when the vehicle speed exceeds a predetermined value, wherein the replacement tachometer signal includes a replacement pulse for each pulse in the tachometer signal, and wherein the vehicle control unit has the ability to detect the type of vehicle in which it is installed.

2. The vehicle of claim 1, wherein the tachometer signal indicates an engine speed, and wherein the vehicle control unit also disconnects the tachometer pulse sequence from the tachometer sensor and generates a replacement pulse sequence when the engine speed exceeds a second predetermined value.

3. The vehicle of claim 1, wherein the vehicle control unit substitutes a selected number of delayed replacement pulses for the tachometer pulse sequence, and wherein the selected number depends on a margin by which the vehicle speed exceeds the predetermined value, in that the selected number increases as the margin increases.

4. The vehicle of claim 1, wherein the vehicle control unit comprises:
   a device connector;
   an output signal logic;
   a microcontroller; and
   a nonvolatile memory, wherein said output signal logic replaces the tachometer pulse sequence with a delayed replacement pulse sequence if required.

5. The vehicle of claim 4, wherein the replacement pulse sequence is generated automatically by the output signal logic.

6. The vehicle of claim 4, wherein the replacement pulse sequence is generated in response to a trigger from the microcontroller.

7. The vehicle of claim 4, wherein the output signal logic comprises:
   a relay switch that can be closed by the microcontroller to pass the tachometer signal; and
   at least one output pulse generator switch for generating a replacement pulse.

8. The vehicle of claim 7, wherein the output pulse generator switch connects the replacement signal to a supply voltage from the vehicle.

9. The vehicle of claim 7, wherein the output pulse generator switch connects the replacement signal to a supply voltage from the vehicle control unit.

10. The vehicle of claim 1, wherein the engine is disabled if tampering is detected.

11. The vehicle of claim 10, wherein the engine is disabled if a wire between the device connector and the speedometer is severed.

12. The vehicle of claim 11, wherein tampering is detected by a signal conditioning circuit that notifies the microcontroller with a voltage signal, wherein said voltage signal is compared to a voltage window.

13. The vehicle of claim 10, wherein the engine is disabled if the tachometer signal is shorted to the replacement signal.

14. The vehicle of claim 13, wherein tampering is detected by monitoring for a replacement tachometer pulse when the vehicle is idling, at an instant when the relay switch is open and no replacement tachometer pulse should be present.

15. The vehicle of claim 1, wherein a handheld unit communicates a parameter setting to the vehicle control unit.

16. The vehicle of claim 15, wherein the handheld unit is a wireless keychain.

17. The vehicle of claim 1, wherein operational parameters are set by:

comparing a plurality of representative gear ratios to a plurality of vehicle gear values stored within the vehicle control unit, wherein each of the representative gear ratios corresponds to a gear the vehicle has been driven in;

matching the representative gear ratios to a predetermined number of the plurality of vehicle gear values; and retrieving a set of operational parameters, specific to the vehicle type, for use the next time the vehicle is driven.

18. The vehicle of claim 17, wherein the plurality of vehicle gear values are generated manually by testing specific vehicle types and calculating the plurality of vehicle gear values for insertion into a database within the vehicle control unit.

19. The vehicle of claim 17, wherein the plurality of vehicle gear values are generated automatically by transmitting rotational information to a database within the vehicle control unit from a rotational sensor located on a wheel of the vehicle and translating the information into the plurality of vehicle gear values.

20. A vehicle control unit configured to receive a tachometer signal, generated by a tachometer sensor and comprised of a tachometer pulse sequence, and a speedometer signal which indicates a vehicle speed, and coupled to an electronic ignition system of an engine to output a replacement tacometer signal which comprises a replacement pulse sequence, wherein the replacement tachometer signal includes a replacement pulse for each pulse in the tachometer signal, and wherein the vehicle control unit delays pulses in the replacement tachometer signal relative to corresponding tachometer pulses in the tachometer signal when the vehicle speed exceeds a predetermined value.

21. The vehicle control unit of claim 20, wherein the tachometer signal indicates an engine speed, and wherein the vehicle control unit also disconnects the tachometer pulse sequence from the tachometer sensor and generates a replacement pulse sequence when the engine speed exceeds a second predetermined value.

22. The vehicle control unit of claim 20, wherein the vehicle control unit substitutes a selected number of delayed replacement pulses for the tachometer pulse sequence, and wherein the selected number depends on a margin by which the vehicle speed exceeds the predetermined value, in that the selected number increases as the margin increases.

23. The vehicle control unit of claim 20, comprising:

a device connector;

an output signal logic;

a microcontroller; and a nonvolatile memory, wherein said output signal logic replaces the tachometer pulse sequence with a delayed replacement pulse sequence if required.

24. The vehicle control unit of claim 23, wherein the replacement pulse sequence is generated automatically by the output signal logic.

25. The vehicle control unit of claim 23, wherein the replacement pulse sequence is generated in response to a trigger from the microcontroller.

26. A method for limiting the engine speed of a vehicle comprising the steps of:

configuring a vehicle control unit to receive a tachometer signal and a speedometer signal said speedometer signal indicates a vehicle speed;

coupling the vehicle control unit to an electronic ignition system of an engine; and outputting a replacement tachometer signal which comprises a replacement pulse sequence, wherein the replacement tachometer signal includes a replacement pulse for each pulse in the tachometer signal, and wherein the vehicle control unit delays pulses in the replacement tachometer signal relative to corresponding tachometer pulses in the tachometer signal when the vehicle speed exceeds a predetermined value.

27. The method of claim 26, wherein the tachometer signal indicates an engine speed, and wherein the vehicle control unit also disconnects the tachometer pulse sequence from the tachometer sensor and generates a replacement pulse sequence when the engine speed exceeds a second predetermined value.

28. The method of claim 26, wherein the vehicle control unit substitutes a selected number of delayed replacement pulses for the tachometer pulse sequence, and wherein the selected number depends on a margin by which the vehicle speed exceeds the predetermined value, in that the selected number increases as the margin increases.

29. The method of claim 26, wherein the engine is disabled if tampering is detected.

30. The method of claim 29, wherein the engine is disabled if a wire between the device connector and the speedometer is severed.

31. The method of claim 30, wherein tampering is detected by a signal conditioning circuit that notifies the microcontroller with a voltage signal, wherein said voltage signal is compared to a voltage window.

32. The method of claim 29, wherein the engine is disabled if the tachometer signal is shorted to the replacement signal.

33. The method of claim 32, wherein tampering is detected by monitoring for a tachometer pulse when the vehicle is idling, at an instant when the relay switch is open and no tachometer pulse should be present.

* * * * *

UNITED STATES PATENT AND TRADEMARK OFFICE
CERTIFICATE OF CORRECTION

PATENT NO. : 6,871,132 B2
DATED : March 22, 2005
INVENTOR(S) : Olsen et al.

It is certified that error appears in the above-identified patent and that said Letters Patent is hereby corrected as shown below:

<u>Title page,</u>
Item [73], Assignee, should read -- VERITAS DGC Inc. --

Signed and Sealed this

Twenty-fourth Day of May, 2005

JON W. DUDAS
*Director of the United States Patent and Trademark Office*